United States Patent
Katarki et al.

(10) Patent No.: US 9,996,301 B1
(45) Date of Patent: Jun. 12, 2018

(54) SYSTEMS AND METHODS FOR LIST RETRIEVAL IN A STORAGE DEVICE

(71) Applicant: Oracle International Corporation, Redwood Shores, CA (US)

(72) Inventors: Archana Katarki, Acton, MA (US); James Kremer, Longmont, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 15/380,184

(22) Filed: Dec. 15, 2016

(51) Int. Cl.
  *G06F 12/12* (2016.01)
  *G06F 3/06* (2006.01)
  *G06F 12/08* (2016.01)

(52) U.S. Cl.
  CPC .......... *G06F 3/0659* (2013.01); *G06F 3/0604* (2013.01); *G06F 3/0638* (2013.01); *G06F 3/0683* (2013.01); *G06F 12/08* (2013.01); *G06F 2212/1016* (2013.01)

(58) Field of Classification Search
  CPC ....... G06F 3/0659; G06F 12/08; G06F 3/0638
  USPC .......................................................... 711/117
  See application file for complete search history.

(56) References Cited

U.S. PATENT DOCUMENTS

| 2005/0060647 A1 | 3/2005 | Doan et al. |
| 2008/0306910 A1 | 12/2008 | Singh |
| 2009/0240935 A1* | 9/2009 | Shukla ................ G06F 9/44505 713/100 |

OTHER PUBLICATIONS

International Application No. PCT/US2017/065610, International Search Report and Written Opinion dated Feb. 1, 2018, 10 pages.

* cited by examiner

*Primary Examiner* — Jae Yu
(74) *Attorney, Agent, or Firm* — Kilpatrick Townsend & Stockton LLP

(57) ABSTRACT

Systems and methods for list retrieval in a storage device are provided that significantly reduces the number of commands needed to retrieve data. A single command or request may be issued to receive data stored at a parent node, a child node, and/or a grandchild node. For example, a request may be issued that includes a node corresponding to a particular level, a depth level below that particular level to which to obtain data and/or filter criteria. With this information, the requested information may be obtained to the depth level while filtering out information not included in the request. When the request corresponds to a parent node and information about the children nodes is desired, for example, additional requests are not needed to obtain information from all of the parent node and the children nodes. Thus, the length of time needed to provide certain stored management information is reduced.

20 Claims, 9 Drawing Sheets

SYSTEMS AND METHODS FOR LIST RETRIEVAL IN A STORAGE DEVICE

FIELD

The present disclosure generally relates to storage systems, and more specifically to systems and methods for list retrieval in a storage device.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage devices that include arrays of storage media. Typically, these storage systems include a file system for storing and accessing files. In addition to storing system files (e.g., operating system files, device driver files, etc.), the file system provides storage and access of user data files.

Typically, large volume storage systems include an interface or other management portal through which users, such as administrators, may control or manage the system via devices or applications. For example, a storage device may include an interface accessible through a user's computing device or terminal. The interface provides a portal through which commands may be sent to the storage system to control the operations of the system. The management program may receive such operations as adding valid users to the system, such that the users may store and/or retrieve data stored in the storage system, selecting or deselecting certain features of the storage system (such as activating redundancy to one or more files stored in the system), and/or configuring the underlying physical devices of the storage system to improve the efficiency of the storage system. In general, the management portal and/or computing device may receive any number of instructions from a system administrator to configure and manage the data storage system.

BRIEF SUMMARY

Provided are methods, including computer-implemented methods, devices including storage devices, and computer-program products for list retrieval.

According to some embodiments, a method is provided. The method comprises storing, by a storage device, data relating to the storage device. The data is stored at a plurality of nodes. the plurality of nodes comprises a hierarchy of one or more levels. Each of the plurality of nodes stores a portion of the data. The method further comprises receiving a data request. The data request identifies a first node of the plurality of nodes and a depth level. The depth level corresponds to one of the one or more levels. The method further comprises identifying one or more additional nodes of the plurality of nodes corresponding to the depth level. The method further comprises generating a command for a subset of the data stored at the first node. The method further comprises generating one or more additional commands for one or more additional subsets of the data stored at the one or more additional nodes. The command and the one or more additional commands are GET commands associated with a representational state transfer application programming interface (RESTful API). The method further comprises issuing the command to the RESTful API. The method further comprises receiving, from the RESTful API, a first response to the command, the first response including the subset of the data from the first node. The method further comprises issuing the one or more additional commands to the RESTful API. The method further comprises receiving, from the RESTful API, one or more additional responses to the one or more additional commands. The one or more additional responses include the one or more additional subsets of the data from the one or more additional nodes. The method further comprises merging the subset of the data and the one or more additional subsets of the data in a response to the data request. The method further comprises transmitting the response to the data request.

According to some embodiments of the invention, a device is provided. The device comprises one or more processors. The device further comprises a non-transitory computer-readable medium containing instructions that, when executed by the one or more processors, cause the one or more processors to perform operations including the method described above.

According to some embodiments, a computer-program product is provided. The computer-program product is tangibly embodied in a non-transitory machine-readable storage medium of a device including instructions that, when executed by one or more processors, cause the one or more processors to perform the method described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
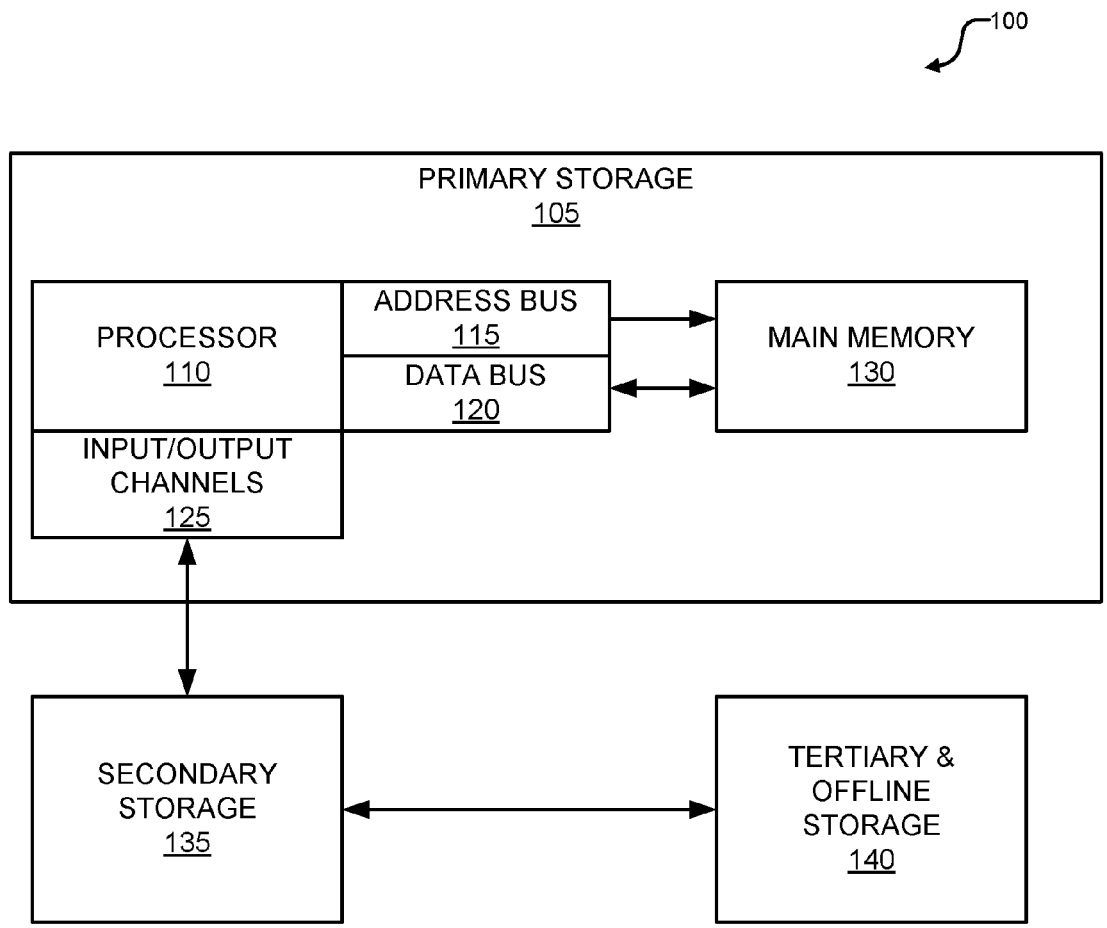
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

Figure 2:
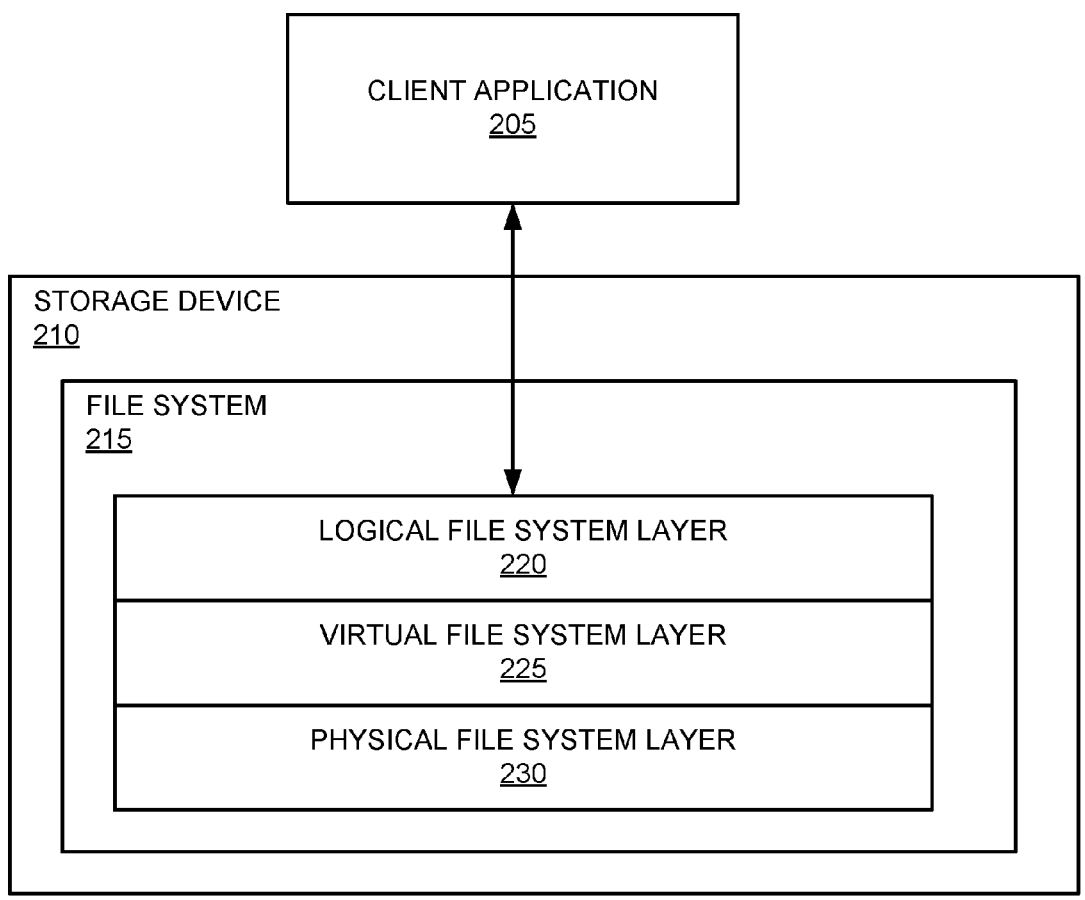
FIG. 2 is a block diagram illustrating the layers of a file system of a storage device, in accordance with some embodiments.
Figure 3:
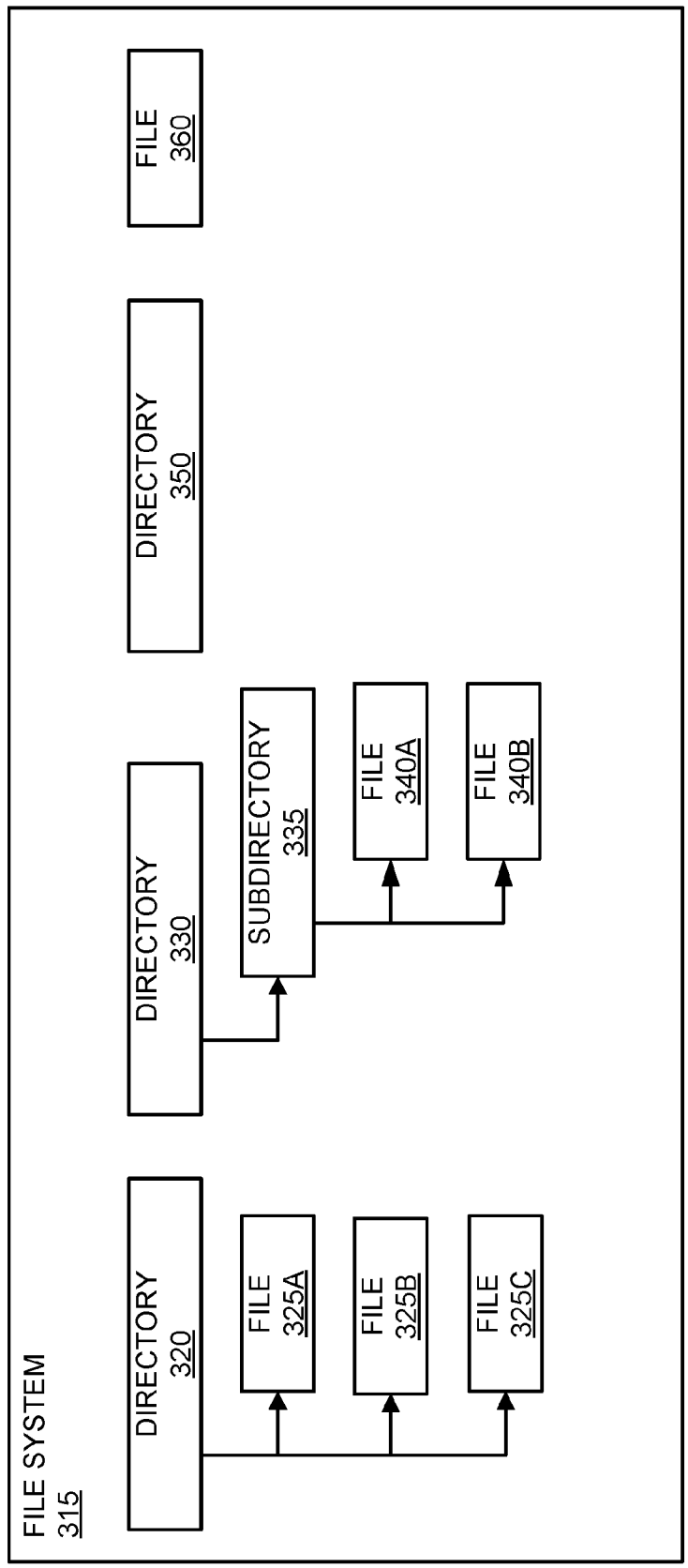
FIG. 3 is a block diagram illustrating a hierarchy for data stored or mounted in a file system, in accordance with some embodiments.

A storage device of a data storage system may implement one or more file systems to organize the data stored thereon. As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
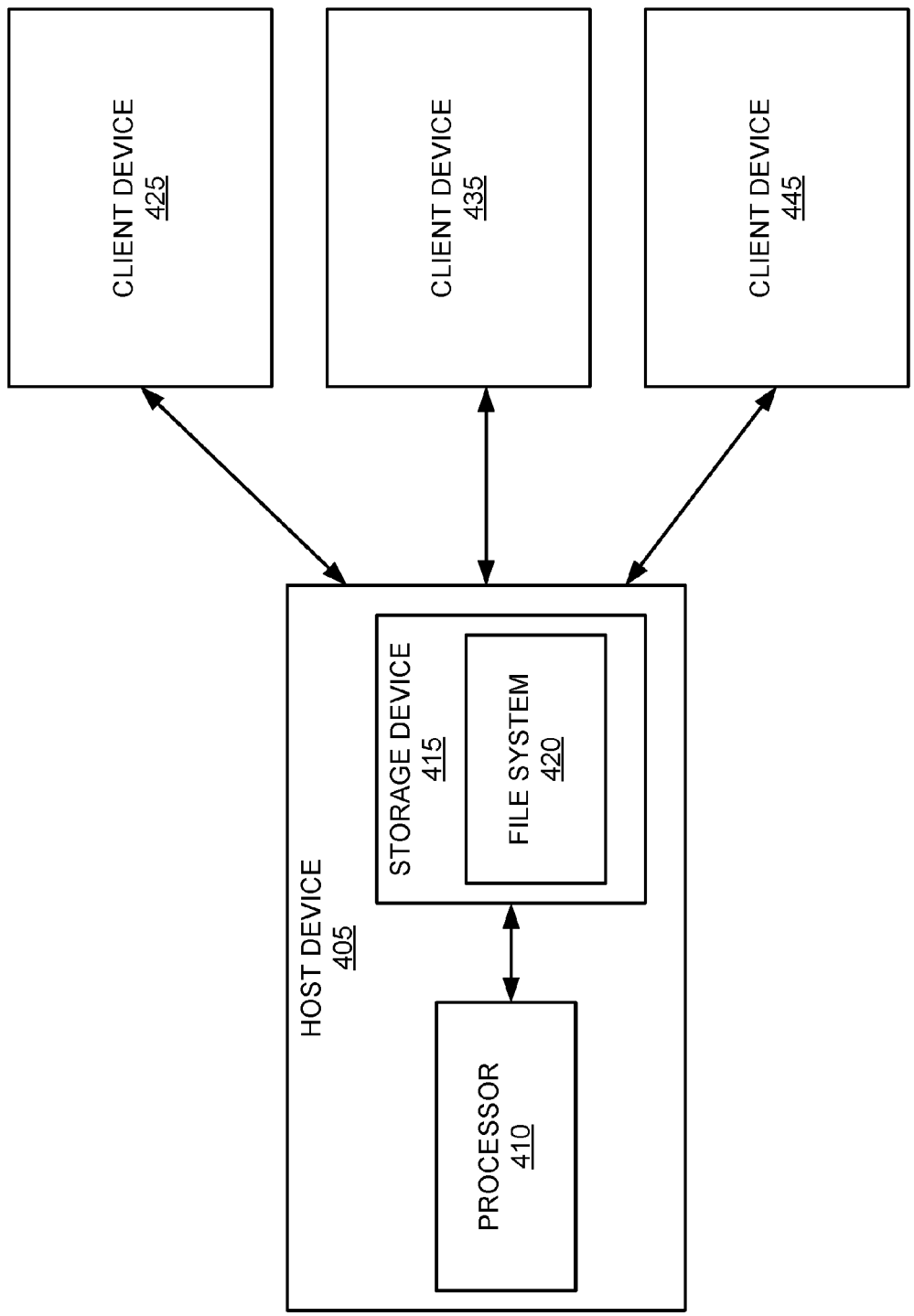
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405.

The host device 405 may communicate over a network with the client devices 425, 435, 445. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Data Management Interfaces

In general, a management interface to a storage device may maintain particular information or data that is utilized to manage the storage device (i.e., management data). For example, the management interface may maintain a list of all users (e.g., client devices 425, 435, 445 of FIG. 4) that may access the storage device, including users capable of storing data on the storage device, users capable of reading data from the storage device, users with administrative privileges to configure the preferences and accessibility of the users of the storage device, and so on.

To obtain this information, a system administrator may access the management interface through a computing device, such as a desktop computer or terminal computer. Through the computing device, the system administrator may provide commands to the management interface to manage or configure the storage device. One such management feature available through the management interface may be a list of system information. For example, a system administrator may utilize the management interface to request a list of all of the users of the storage device. In response, the management interface may compile the list of users of the storage device and return the list to the system administrator. If other information is requested, additional requests may be entered into the computing device by the system administrator. In general, information stored in children or grandchildren nodes associated with a user (or other type of node item) may be accessed through several commands provided by the system administrator and several returns of information back to the computing device.

One exemplary storage device implementing a management interface is a Z File System Storage Appliance (ZFSSA). In addition to one or more interactive management interfaces, the ZFSSA may have a robust scripting engine and a representational state transfer application programming interface (RESTful API). In general, the scripting engine may be used to write scripts to manage the ZFSSA. The RESTful API is a programmatic interface that may be used to provide interoperability between computing devices over a network. The RESTful API may allow a computing device to access and manipulate data on a storage device using uniform and predefined stateless operations. In a RESTful API, requests may be received and responses generated according to a defined format, such as hypertext transfer protocol (HTTP). In HTTP, the operations available may include GET to retrieve data, POST to create data, PUT to change the state of or update data, DELETE to remove data, and the like. By breaking down a transaction into a series of small transactions defined by predetermined operations, a RESTful API may achieve efficient performance, enhanced reliability, simplicity, and scalability.

Both the scripting engine and the RESTful API may provide data in various forms about the ZFSSA. One of the forms of data is a list, as described above, such as a list of users on the storage device. Conventionally, the scripting engine merely provides names of list items. The RESTful API provides names of list items as well as properties of list items. However, to obtain any further information about these list items, the system administrator must enter the context of each item, then request the additional data, such as the children of these list items. As described above, this may result in the system administrator issuing multiple commands, as the RESTful API only allows for a discrete number of predefined operations. For example, to get information about both a user and a user's permissions, a system administrator may have to issue a first GET command for a parent node representing the user, and a second GET command for a child node representing that user's permissions.

In addition, the scripting engine and the RESTful API have no filtering capabilities. For example, the management interface is conventionally unable to return a list of all users with administrator privileges. Thus, to obtain this information, system administrators would have to use a third party tool or write their own filtering application. Although described with respect to a ZFSSA, it is contemplated that many other types of storage devices may face similar limitations.

Systems for List Retrieval

In some embodiments, a system for list retrieval in a storage device is provided that significantly reduces the number of commands needed to retrieve data. The data may be stored in a node structure, with some data stored in a node that is dependent or otherwise related to a parent node. For example, a parent node may include an identifier of that user, such as a username, a log-in name, and/or the like. Children node based on that parent node may include properties (e.g., permissions) of that particular user of the storage device, access exceptions for that user, a user's preferences, and/or the like. Further still, grandchildren nodes may be dependent on the children nodes with still other types of information about the user, creating a hierarchical tree structure of storage information about the particular user.

According to some embodiments, a single command or request may be issued to receive data stored at a parent node, a child node, and/or a grandchild node. For example, a data request may be issued that includes a node and a depth level (e.g., child, grandchild, great grandchild, etc.) and/or filter criteria. With this information, the requested information may be obtained to the particular level while filtering out information not included in the request. When the request corresponds to a child node associated with a parent node, for example, additional requests are not needed to obtain information from both the child node and the parent node. Thus, the length of time needed to provide certain stored management information is reduced.

Figure 5:
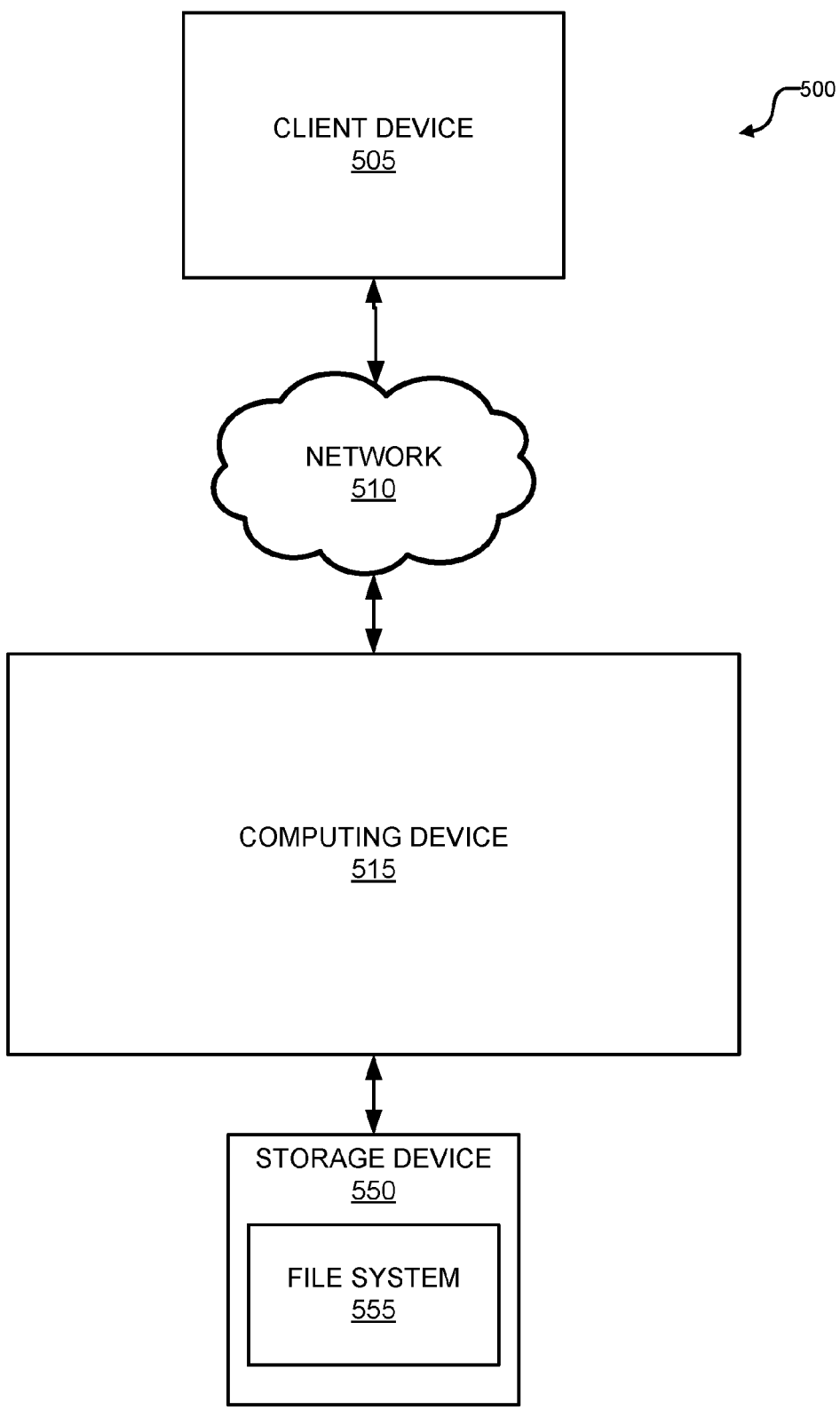
FIG. 5 is a block diagram illustrating a system for list retrieval in a storage device, in accordance with some embodiments.

FIG. 5 is a block diagram illustrating a system 500 for list retrieval in a storage device, in accordance with some embodiments. The system 500 may include a client device 505, a network 510, a computing device 515, and a storage device 550. The storage device 550 may include a file system 555. The client device 505 may be operated by, for example, a system administrator or other user. Although shown as including a single client device 505, it is contemplated that any number of client devices may have access to the computing device 515 and/or the storage device 550, and may perform the functions of the client device 505. Further, although shown as being separate from the computing device 515, it is contemplated that the storage device 550 may be integrated into the computing device 515 in some embodiments.

The computing device 515 may provide an interface to the storage device 550 for use by the client device 505, such that the client device 505 may issue commands to the storage device 550. Some or all of the data maintained on the storage device 550 may be shared with the client device 505 via one or more scripts or protocols, such as an application programming interface (API) implemented on the computing device 515. In other words, the computing device 515 may be a client of an API. An API is an interface that allows a user (e.g., a user of client device 505) to access data (e.g., data on the storage device 550). For example, a user may interact with a webpage. The interactions may include request and response communications with a web server. The web server can, in response to particular types of interactions, generate and transmit API requests that are sent to a data management server (e.g., computing device 515). The API may be implemented by the data management server. The data management server may receive an API request, retrieve data responsive to the API request, and return it (e.g., in a JavaScript Object Notation (JSON) format). RESTful APIs are one type of API that conform with the REST architecture.

In FIG. 5, the storage device 550 may store data relating to the storage device, such as data relating to the management of the storage device 550. In some embodiments, the data may be stored in lists. The data may be stored at a plurality of nodes on a plurality of levels in a hierarchy. In other words, at least some of the plurality of levels may be sublevels of one or more other of the plurality of levels. Each of the plurality of nodes may store a portion of the data relating to the storage device. Thus, the data relating to the storage device may be stored in a hierarchical tree structure, as illustrated and described further with respect to FIG. 7.

The computing device 515 may receive a data request from the client device 505 over the network 510. The data request may be received according to any protocol or script. In some embodiments, the data request is received according to a protocol other than RESTful API. The data request may identify a first node of the plurality of nodes. For example, the data request may be "http://www.website.com/users", and the node may be "users". The node may be a directory, subdirectory, folder, file, metadata, or other data object. In some embodiments, each node may include one or more other nodes, such as a directory containing subdirectories, and subdirectories containing files. In the above example, a parent node may correspond to the directory www.website.com and a child node may correspond to the subdirectory "users". Grandchildren nodes may be folders corresponding to particular users in the subdirectory "users", e.g., "user1", "user2", "user3", etc. Great grandchildren nodes may be properties corresponding to a particular user, e.g., "preferences", "exceptions", etc. As used herein, "parent node" may refer to any node including another node at any level, e.g., a parent node, a grandparent node, a great grandparent node, etc. "Child node" may refer to any node included within another node at any level, e.g., a child node, a grandchild node, a great grandchild node, etc.

The data request may include or otherwise be associated with a depth level corresponding to a level of the hierarchical levels. The depth level may indicate the amount and detail of data requested for that node and its children nodes. In the above example, a depth level of "0" may list the items in the "users" node, e.g., "user1", "user2", "user3", etc. A depth level of "1" may list any properties corresponding to each of the listed items, e.g., "preferences" for "user1", "preferences" and "exceptions" for "user2", "exceptions" for "user3", etc. Although described with respect to two depth levels, it is contemplated that any number of depth levels may be implemented to represent any depth of hierarchical data.

The computing device 515 may identify additional nodes corresponding to the depth level, such as children nodes if the a depth level of "1" is specified, grandchildren nodes if a depth level of "2" is specified, great grandchildren nodes if a depth level of "3" is specified, etc. In the above example, if a depth level of "0" is specified, the computing device 515 may identify the node corresponding to "users". If a depth level of "1" is specified, the computing device 515 may also identify the nodes corresponding to "user1", "user2", "user3", etc.

The computing device 515 may generate a command for a subset of the data stored at the first node. The computing device 515 may also generate one or more additional commands for one or more additional subsets of the data stored at the one or more additional identified nodes. The command and the one or more additional commands may be data request commands, such as READ commands, GET commands, and/or the like. The computing device 515 may issue the command and the one or more additional commands to an API, such as the RESTful API. As described above, because the RESTful API implements a discrete number of simple commands, the data request received from the client device 505 may not be able to be directly passed to the RESTful API in order to receive data corresponding to all of the first node and the one or more additional nodes corresponding to the depth level.

In some embodiments, the request of the client device 505 may be passed to the computing device 515, which may break the request into the multiple commands needed to communicate with the RESTful API. Once a response to the command and one or more additional responses to the one or more additional commands are received, the RESTful API may receive the subset of the data from the first node and the one or more additional subsets of data from the one or more additional nodes (e.g., children nodes). The RESTful API may then return the subset of the data and the one or more additional subsets of the data to the computing device 515, with each subset of data being returned in a separate communication responsive to each command. In some embodiments, each subset of data may be returned in conjunction with an identification of its associated node, such that it is clear to which node the subset of data corresponds. In some embodiments, a subset of data must be returned in response to a particular command before a next command can be issued, such that the node is known for a particular received subset of data.

In the above example, a first command may be generated for the data at "users", which may return, for example, a list of user names authorized to access the storage device 550. For a RESTful API, the first command may be "GET http://www.website.com/users". If the indicated depth level is "1", a second command may be generated for the data at a node associated with a user name in the list of user names, which may return, for example, a list of properties associated with each user. For a RESTful API, the second command may be "GET http://www.website.com/users/user1". Third and subsequent commands may be generated for the data at the nodes associated with the other user names in the list of user names, e.g., "GET http://www.website.com/users/user2", "GET http://www.website.com/users/user3", etc.

The computing device 515 may merge the subset of the data with the one or more additional subsets of the data to form a response to the data request. For example, the computing device 515 may organize the subsets of data in a hierarchical tree structure that indicates the relationship between the subsets of the data. The computing device 515 may transmit the response to the data request to the client device 505 over the network 510.

Figure 6:
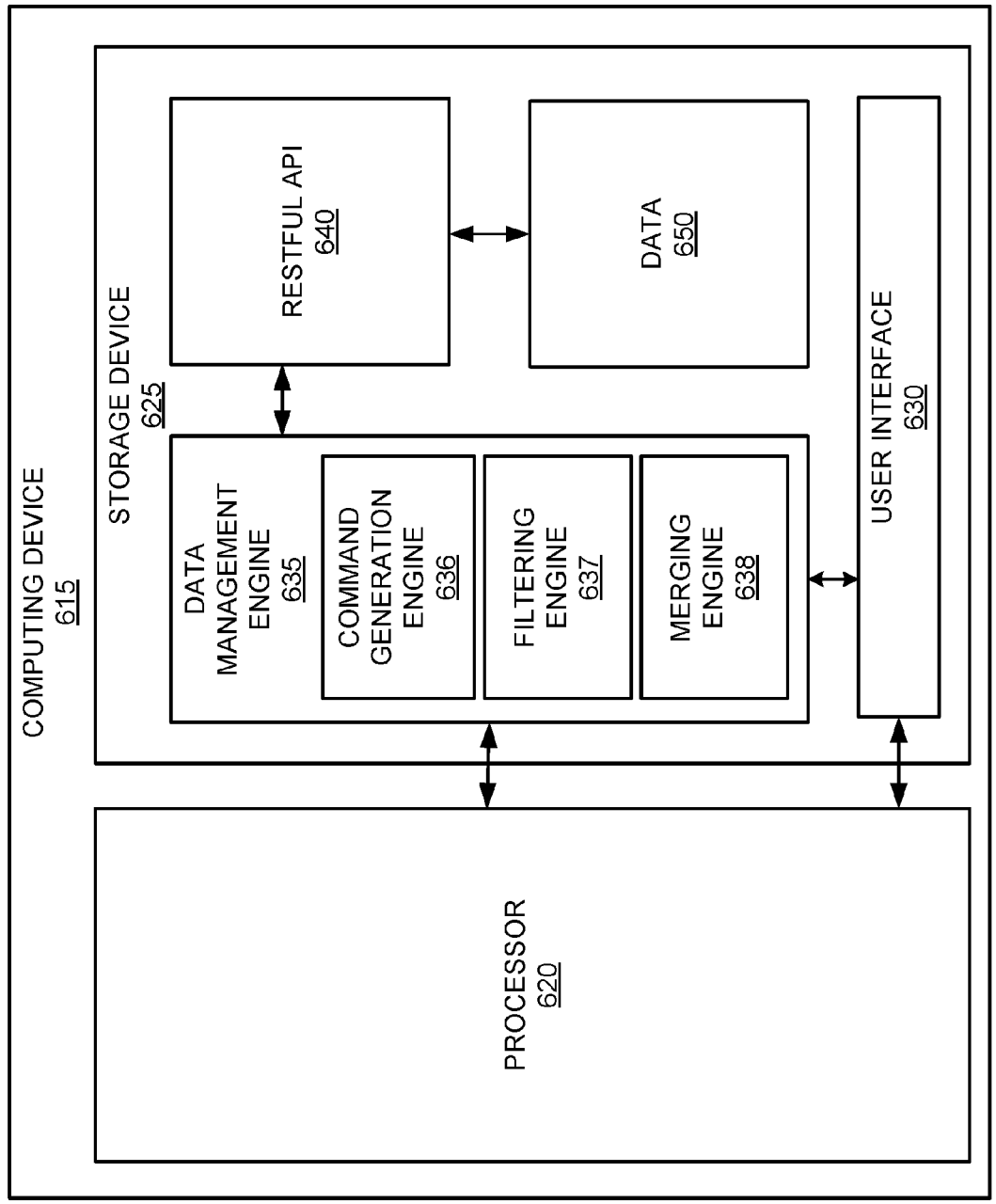
FIG. 6 is a block diagram illustrating a computing device for list retrieval, in accordance with some embodiments.

FIG. 6 is a block diagram illustrating a computing device 615 for list retrieval, in accordance with some embodiments. The computing device 615 may be used to implement the computing device 515 of FIG. 5, for example. The computing device 615 may include a processor 620 and a storage device 625. The storage device 625 may be used to implement the storage device 550 of FIG. 5, for example. Although shown and described as being internal to the computing device 615, it is contemplated that the storage device 625 may instead be positioned external to the computing device 615, as is the case with respect to FIG. 5.

The storage device 625 may include a user interface 630 that is in operative communication with the processor 620. In some embodiments, the user interface 630 interfaces with a client device (e.g., client device 505 of FIG. 5) in order to receive commands and issue responses, as described further herein. In some embodiments, the user interface 630 may further be configured to interface with a user directly, e.g., to receive commands via an input mechanism directly coupled to the computing device 615. The user interface 630 may communicate with a user according to any protocol or script. In some embodiments, the user interface 630 receives commands from a user according to a protocol different than RESTful API.

The storage device 625 may further include a data management engine 635 that is in operative communication with the processor 620 and/or the user interface 630. The data management engine 635 may include a command generation engine 636, a filtering engine 637, and a merging engine 638. The command generation engine 636 may be configured to receive a data request via the user interface 630 identifying a first node and a depth level corresponding to one or more levels of the node or a child node of the node. The command generation engine 636 may be configured to identify one or more additional nodes corresponding to the depth level. The command generation engine 636 may further be configured to generate a command for a subset of the data stored at the first node and one or more additional commands for one or more additional subsets of the data stored at the one or more additional nodes (e.g., children nodes of the depth level is greater than "0"). The command and the one or more additional commands may be, for example, data-access commands, such as GET commands associated with the RESTful API 640. The command generation engine 636 may issue the command and the one or more additional commands to the RESTful API 640.

The RESTful API 640 may receive the command and the one or more additional commands from the data management engine 635. The RESTful API 640 may use these commands to receive the corresponding data 650 from the first node and the one or more additional nodes. The RESTful API 640 may then pass the data 650 to the data management engine 635. Although shown and described with respect to a RESTful API 640 in FIG. 6, it is contemplated that similar functions may be performed with respect to other API architectures and commands.

In some embodiments, the data request received via the user interface 630 may include filtering criteria, such as one or more data requirements. In such embodiments, the data management engine 635 may implement a filtering engine 637; however, in other embodiments, the filtering engine 637 may be omitted. The filtering engine 637 may be configured to receive the data 650 from the RESTful API 640 and apply the filtering criteria to the data 650 by including only that data 650 that conforms with the one or more data requirements. For example, the data 650 may include a list of users authorized to access the storage device 625 and a list of permissions for each of the users. The filtering criteria may specify only users who have WRITE permissions for the storage device 625. Thus, the filtering engine 637 may extract only the users with WRITE permissions from the list of users authorized to access the storage device 625 and their corresponding permissions. The filtering engine 637 may then pass the filtered data to the merging engine 638.

The merging engine 638 of the data management engine 635 may receive the requested data (e.g., either the filtered data from the filtering engine 637 or the data 650 from the RESTful API 640). The merging engine 638 may merge the requested data to form a response to the data request. For example, the merging engine 638 may organize the data 650 in a hierarchical tree structure that indicates the relationship between the subsets of the data 650. The merging engine 638 may be configured to communicate with the user interface 630 to transmit the response to the data request to the requestor (e.g., the client device).

Although described as occurring prior to merging, it is contemplated that the filtering functions performed by the filtering engine 637 may instead be performed after data 650 has been merged by the merging engine 638. In such embodiments, the filtering engine 637 may filter the response to the data request after it has been formed by the merging engine 638. The filtering engine 637 may then transmit the response to the data request to the requestor (e.g., the client device).

Figure 7:
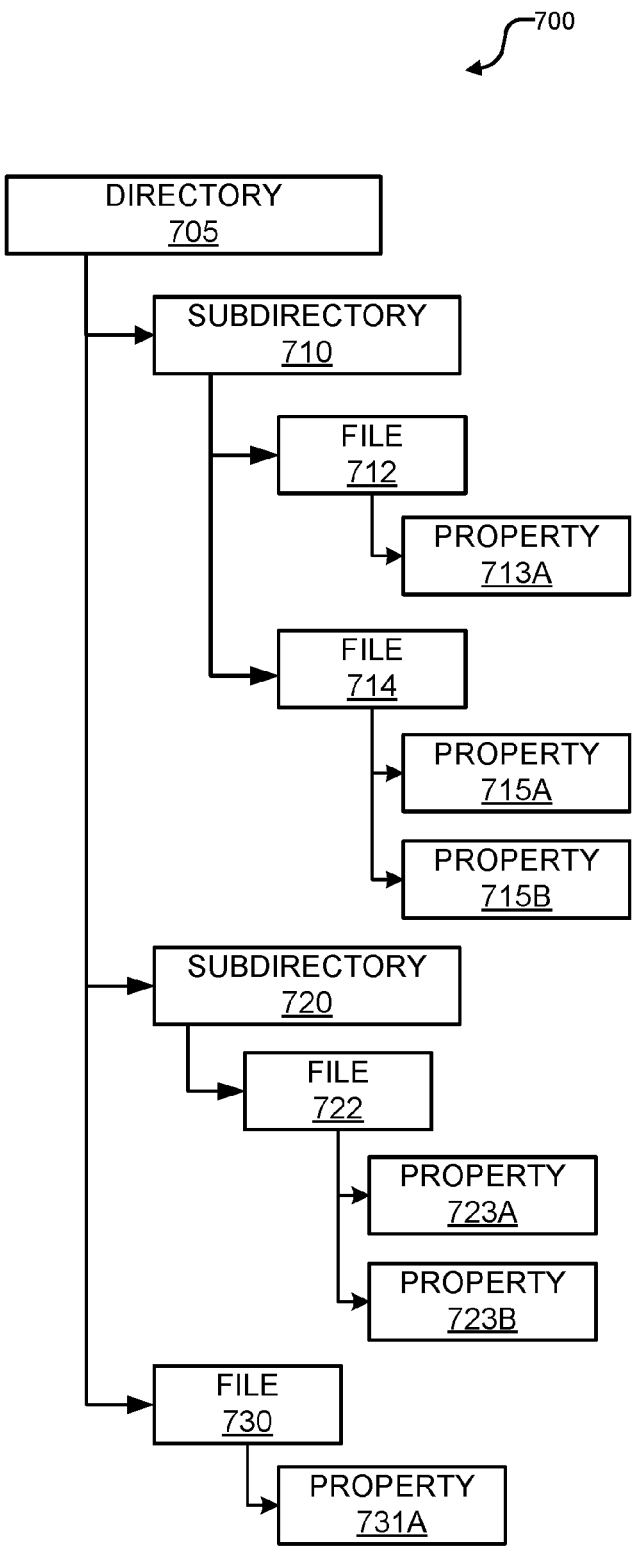
FIG. 7 is a block diagram illustrating nodes and levels in a file system, in accordance with some embodiments.

As described above, data may be stored on a storage device at particular nodes and levels. FIG. 7 is a block diagram illustrating nodes and levels in a file system 700, in accordance with some embodiments. The file system 700 may be implemented as file system 555 of storage device 550 of FIG. 5, for example.

As shown in FIG. 7, the file system 700 has thirteen nodes (one node corresponding to each directory, subdirectory, file, and property) on four levels. The first level includes directory 705. Directory 705 may be, for example, "www.users.com". The second level includes subdirectory 710, subdirectory 720, and file 730, and is a sublevel of the first level. Thus, directory 705 is a parent node of subdirectory 710, subdirectory 720, and file 730. The third level includes file 712, file 714, file 722, and property 731A, and is a sublevel of the second level. The fourth level includes property 713A, property 715A, property 715B, property 723A, and property 723B, and is a sublevel of the third level.

Subdirectory 710 is a parent node of file 712 and file 714. Thus, directory 705 is a grandparent node of file 712 and file 714. Subdirectory 710 may correspond, for example, to a folder named "username1" in directory 705. File 712 may correspond, for example, to "preferences", and file 714 may correspond, for example, to "permissions". File 712 may be a parent node of property 713A. Property 713A may include, for example, a session timeout preference associated with username1. File 714 may be a parent node of property 715A and property 715B. Property 715A may indicate, for example, that username1 has READ permissions on directory 705, and property 715B may indicate, for example, that username1 has WRITE permissions on directory 705.

Subdirectory 720 is a parent node of file 722. Thus, directory 705 is a grandparent node of file 722. Subdirectory 720 may correspond, for example, to a folder named "username2" in directory 705. File 722 may correspond, for example, to "preferences". File 722 may be a parent node of property 723A and property 723B. Property 723A may indicate, for example, a log-in screen preference for username2, and property 723B may indicate, for example, a session timeout preference for username2.

File 730 is a parent node of property 731A. Thus, directory 705 is a grandparent node of property 731A. File 730 may correspond, for example, to a file named "administrator" in directory 705. Property 731A may correspond, for example, to system administrator preferences.

As an example, a data request may be received by a computing device identifying a first node corresponding to directory 705 and a depth level of "3". The depth level may indicate the depth of sublevels of directory 705 should be identified. For example, a depth level of "0" may indicate that no sublevels should be identified, and data should only be retrieved from the node associated with directory 705. A depth level of "1" may indicate that data should be retrieved from both the node associated with directory 705 and the direct children nodes of directory 705 (i.e., subdirectory 710, subdirectory 720, and file 730). A depth level of "2" may indicate that data should be retrieved from the node associated with directory 705, the direct children nodes of directory 705, and the grandchildren nodes of directory 705 (i.e., file 712, file 714, file 722, and property 731A). A depth level of "3" may indicate that data should be retrieved from the node associated with directory 705, the direct children nodes of directory 705, the grandchildren nodes of directory 705, and the great grandchildren nodes of directory 705 (i.e., property 713A, property 715A, property 715B, property 723A, and property 723B).

In the above example in which the depth level is "3", the computing device may identify the children nodes, the grandchildren nodes, and the great grandchildren nodes (e.g., subdirectory 710, file 712, property 713A, file 714, property 715A, property 715B, subdirectory 720, file 722, property 723A, property 723B, file 730, and property 731A). The computing device may then generate separate commands for each of the node identified by the data request, the children nodes, the grandchildren nodes, and the great grandchildren nodes. Once the data is received, the computing device may merge the data to form a response to the data request according to a hierarchical tree structure. The hierarchical tree structure may indicate the hierarchy shown in FIG. 7.

Thus, according to embodiments of the invention, all of the data corresponding to file system 700 may be retrieved via a single data request from a user. This may be accomplished by receiving an identified node and a depth level, traversing the file system to identify additional nodes (e.g., child nodes) corresponding to the depth level, and automatically generating separate commands for data at the identified node and each of the additional nodes.

Figure 8A:
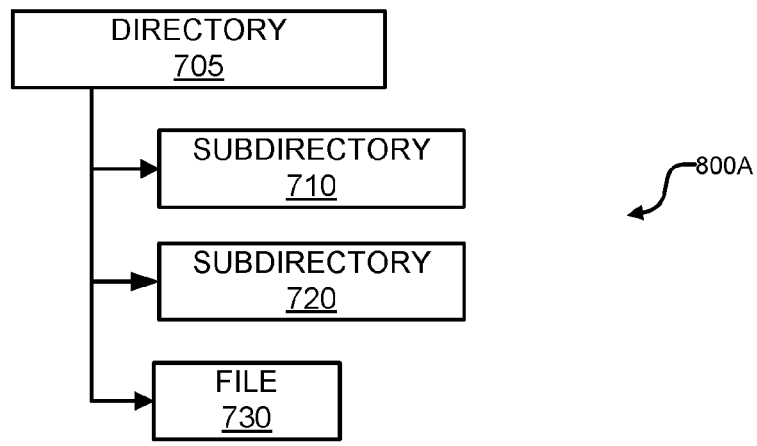
FIGS. 8A-8C are block diagrams illustrating nodes and levels in a file system returned in response to separate commands, in accordance with some embodiments.
Figure 8B:
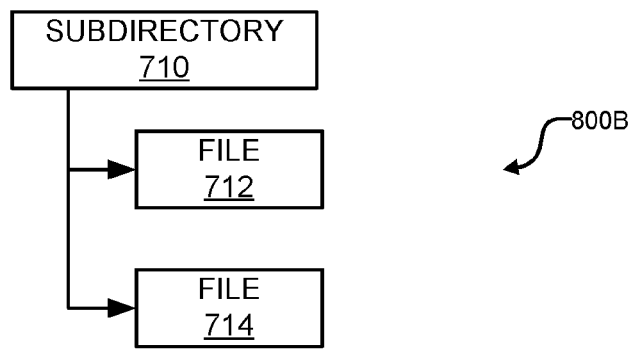
Figure 8C:
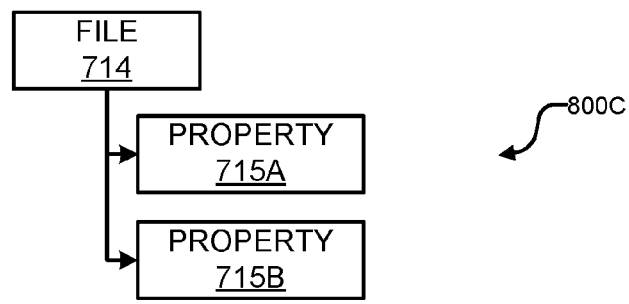

FIG. 8A-8C illustrate the results of multiple separate data requests being made conventionally. These multiple separate data requests (in addition to other data requests not shown) must be made conventionally to retrieve the same data received with respect to FIG. 7 from a single data request. FIG. 8A illustrates the data 800A returned in response to a first data request for the node corresponding to directory 705. As shown, a list of items within directory 705 may be returned (i.e., subdirectory 710, subdirectory 720, and file 730).

To retrieve further data about subdirectory 710, a second data request must be conventionally issued. FIG. 8B illustrates the data 800B returned in response to the second data request for the node corresponding to subdirectory 710. As shown, a list of items within subdirectory 710 may be returned (i.e., file 712 and file 714).

To retrieve further data about file 714, a third data request must be conventionally issued. FIG. 8C illustrates the data 800C returned in response to the third data request for the node corresponding to the file 714. As shown, a list of items within file 714 may be returned (i.e., property 715A and property 715B).

Thus, a requesting user would be able to obtain data regarding directory 705, subdirectory 710, file 714, property 715A, and property 715B only through three separate data requests. To receive all of the data shown in file system 700 of FIG. 7, a user would have to make four additional data requests (not shown): a data request for file 712 (which would return file 712 and property 713A), a data request for subdirectory 720 (which would return subdirectory 720 and file 722), a data request for file 722 (which would return file 722, property 723A and property 723B), and a data request for file 730 (which would return file 730 and property 731A).

In other words, according to conventional systems and methods, and minimum of seven data requests would need to be made by a user to obtain all of the data shown in FIG. 7. Embodiments of the invention allow a user, through the use of a depth level, to make a single data request to obtain all of the data shown in FIG. 7.

Methods for List Retrieval

Figure 9:
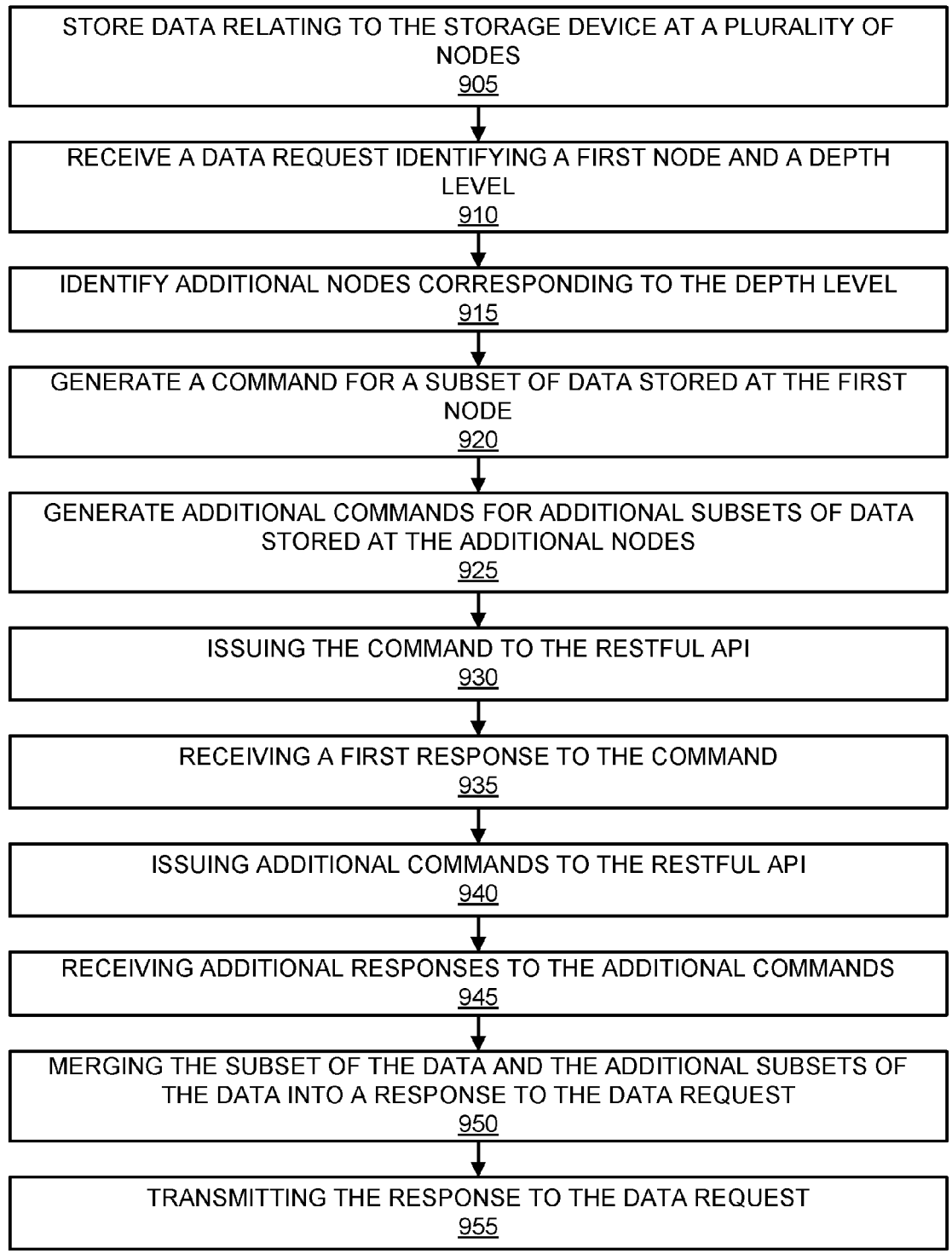
FIG. 9 is a flow chart illustrating a method for list retrieval in a storage device, in accordance with some embodiments.

The systems described above may implement various methods to perform their functions. FIG. 9 is a flow chart illustrating a method for list retrieval in a storage device, in accordance with some embodiments. The method of FIG. 9 may be implemented, for example, by computing device 515 of FIG. 5 and/or computing device 615 of FIG. 6.

At step 905, data relating to a storage device is stored by the storage device. The storage device may be associated with a computing device. The data may be stored at a plurality of nodes. The plurality of nodes may comprise a hierarchy of one or more levels. Each of the plurality of nodes may store a portion of the data. In some embodiments, the data relating to the storage device includes management data for the storage device. The management data may include, for example, features, characteristics, specifications, and/or configurations of the storage device that may be accessed or controlled by a system administrator or other user.

At step 910, a data request may be received. The data request may identify a first node of the plurality of nodes. For example, the data request may be "http://www.example.com/user6", and the first node may be "user6". User6 may be one node of multiple nodes, e.g., user0 through user141. In some embodiments, the data request may include filtering criteria, e.g., only users with WRITE permissions. The data request may be received, for example, from at least one of a remote computing device or an interface of the storage device. The data request may be received over a network. In some embodiments, the data request may be received via a website and/or using an API in response to user input. In some embodiments, the data request may be confirmed as being from an authorized device and/or user, i.e., an entity with the proper permissions to access the requested node.

The data request may further identify a depth level corresponding to one of the one or more levels in the hierarchy. The depth level may indicate the depth of sublevels below the level of the first node that should be identified. For example, a depth level of "0" may indicate that only data relating to the first node should be retrieved. A depth level of "1" may indicate that data relating to children nodes of the first node should be retrieved in addition to data relating to the first node. A depth level of "2" may indicate that data relating to grandchildren nodes of the first node, data relating to children nodes of the first node, and data relating to the first node should be retrieved, and so on and so forth.

At step 915, one or more additional nodes of the plurality of nodes corresponding to the depth level may be identified. The additional nodes may be present on a level encompassed by the depth level, e.g., children nodes for a depth level of "1", grandchildren and children nodes for a depth level of "2", great grandchildren, grandchildren, and children nodes for a depth level of "3", and so on and so forth. In the above example, for a depth level of "1", the additional nodes "preferences", "exceptions", and "permissions" may be identified as child nodes of "user6".

At step 920, a command for a subset of the data stored at the first node is generated. At step 925, one or more additional commands for one or more additional subsets of data stored at the one or more additional nodes is generated. The command and the one or more additional commands may be the same command (e.g., READ, GET, etc.) specifying different subsets of data corresponding to related nodes (i.e., a parent node and a child node). The command and the one or more additional commands may be GET commands associated with a RESTful API. In the above example for a depth value of "1", a first command would be to "GET http://www.example.com/user6", and the additional commands would be to "GET http://www.example.com/user6/preferences", "GET http://www.example.com/user6/exceptions", and "GET http://www.example.com/user6/permissions".

At step 930, the command is issued to the RESTful API. At step 935, a first response to the command is received from the RESTful API. The first response may include the subset of the data from the first node. In the above example, in response to "GET http://www.example.com/user6", the RESTful API may respond with the following list of nodes present under "user6": "preferences, exceptions, permissions".

At step 940, the one or more additional commands are issued to the RESTful API. At step 945, one or more additional responses to the one or more additional commands are received from the RESTful API. The one or more additional responses may include the one or more additional subsets of the data from the one or more additional nodes. In the above example, in response to "GET http://www.example.com/user6/preferences", the RESTful API may respond with the following list of properties present under "preferences": "advanced_analytics: false, session_timeout: 15, login_screen: 'status/dashboard', locale: 'C'". The RESTful API may also respond accordingly to the commands associated with "exceptions" and "permissions".

At step 950, the subset of the data and the one or more additional subsets of the data may be merged to form a response to the data request. For example, the subset of the data and the one or more additional subsets of the data may be organized in a hierarchical tree structure that indicates the relationship between the subsets of the data. The response to the data request may include at least one list. In the above example, the list of "preferences, exceptions, permissions" may be provided under "user6", the list of properties associated with "preferences" may be provided under "preferences", the list of properties associated with "exceptions" may be provided under "exceptions", and the list of properties associated with "permissions" may be provided under "permissions".

At step 955, the response to the data request may be transmitted. In embodiments in which filtering criteria is specified by the data request, the response to the data request may be filtered before it is transmitted. For example, the response may include a list of users authorized to access the storage device and a list of permissions for each of the users. The filtering criteria may specify only users who have WRITE permissions for the storage device. Thus, only the users with WRITE permissions from the list of users authorized to access the storage device and their corresponding permissions may be extracted and transmitted. Although described as occurring after the data is merged, it is contemplated that the filtering criteria may instead be applied to the first subset of the data and the second subset of the data before they are merged.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
storing, by a storage device associated with a computing device, data relating to the storage device, the data being stored at a plurality of nodes, wherein the plurality of nodes comprises a hierarchy of one or more levels, and wherein each of the plurality of nodes stores a portion of the data;
receiving, at the computing device, a data request, wherein the data request identifies a first node of the plurality of nodes and a depth level, and wherein the depth level corresponds to one of the one or more levels;
identifying, by the computing device, one or more additional nodes of the plurality of nodes corresponding to the depth level;
generating, by the computing device, a command for a subset of the data stored at the first node;
generating, by the computing device, one or more additional commands for one or more additional subsets of the data stored at the one or more additional nodes, wherein the command and the one or more additional commands are get commands associated with a representational state transfer application programming interface (RESTful API);
issuing, by the computing device, the command to the RESTful API;
receiving, by the computing device from the RESTful API, a first response to the command, the first response including the subset of the data from the first node;
issuing, by the computing device, the one or more additional commands to the RESTful API;
receiving, by the computing device from the RESTful API, one or more additional responses to the one or more additional commands, the one or more additional responses including the one or more additional subsets of the data from the one or more additional nodes;
merging, by the computing device, the subset of the data and the one or more additional subsets of the data in a response to the data request; and
transmitting, by the computing device, the response to the data request.

2. The method of claim 1, wherein the one or more levels includes a sublevel, and wherein the depth level corresponds to the sublevel.

3. The method of claim 1, wherein the data request is associated with a protocol other than RESTful API.

4. The method of claim 1, wherein the one or more additional commands are each separately issued by the computing device to the RESTful API.

5. The method of claim 1, wherein the one or more additional responses are each separately received by the computing device from the RESTful API.

6. The method of claim 1, wherein the data request includes filtering criteria, and wherein the filtering criteria includes a requirement for at least one of the subset of the data or an additional subset of the data of the one or more additional subsets of the data.

7. The method of claim 6, further comprising:
before transmitting the response to the data request, filtering the at least one of the subset of the data or the additional subset of the data according to the requirement.

8. A device comprising:
one or more processors; and
a non-transitory computer-readable medium containing instructions that, when executed by the one or more processors, cause the one or more processors to perform operations including:
storing, by a storage device associated with the device, data relating to the storage device, the data being stored at a plurality of nodes, wherein the plurality of nodes comprises a hierarchy of one or more levels, and wherein each of the plurality of nodes stores a portion of the data;
receiving a data request, wherein the data request identifies a first node of the plurality of nodes and a depth level, and wherein the depth level corresponds to one of the one or more levels;
identifying one or more additional nodes of the plurality of nodes corresponding to the depth level;
generating a command for a subset of the data stored at the first node;
generating a one or more additional commands for one or more additional subsets of the data stored at the one or more additional nodes, wherein the first command and the one or more additional commands are get commands associated with a representational state transfer application programming interface (RESTful API);
issuing the command to the RESTful API;
receiving, from the RESTful API, a first response to the command, the first response including the subset of the data from the first node;
issuing the one or more additional commands to the RESTful API;
receiving, from the RESTful API, one or more additional responses to the one or more additional commands, the one or more additional responses including the one or more additional subsets of the data from the one or more additional nodes;
merging the subset of the data and the one or more additional subsets of the data in a response to the data request; and
transmitting the response to the data request.

9. The device of claim 8, wherein the one or more levels includes a sublevel, and wherein the depth level corresponds to the sublevel.

10. The device of claim 8, wherein the data request is associated with a protocol other than RESTful API.

11. The device of claim 8, wherein the one or more additional commands are each separately issued to the RESTful API.

12. The device of claim 8, wherein the one or more additional responses are each separately received from the RESTful API.

13. The device of claim 8, wherein the data request includes filtering criteria, and wherein the filtering criteria includes a requirement for at least one of the subset of the data or an additional subset of the data of the one or more additional subsets of the data.

14. The device of claim 13, wherein the operations further includes:

before transmitting the response to the data request, filtering the at least one of the subset of the data or the additional subset of the data according to the requirement.

15. A computer-program product tangibly embodied in a non-transitory machine-readable storage medium of a device, including instructions that, when executed by one or more processors, cause the one or more processors to:

store data relating to a storage device, the data being stored at a plurality of nodes, wherein the plurality of nodes comprises a hierarchy of one or more levels, and wherein each of the plurality of nodes stores a portion of the data;

receive a data request, wherein the data request identifies a first node of the plurality of nodes and a depth level, and wherein the depth level corresponds to one of the one or more levels;

identify one or more additional nodes of the plurality of nodes corresponding to the depth level;

generate a command for a subset of the data stored at the first node;

generate one or more additional commands for one or more additional subsets of the data stored at the one or more additional nodes, wherein the command and the one or more additional commands are get commands associated with a representational state transfer application programming interface (RESTful API);

issue the command to the RESTful API;

receive, from the RESTful API, a first response to the command, the first response including the subset of the data from the first node;

issue the one or more additional commands to the RESTful API;

receive, from the RESTful API, one or more additional responses to the one or more additional commands, the one or more additional responses including the one or more additional subsets of the data from the one or more additional nodes;

merge the subset of the data and the one or more additional subsets of the data in a response to the data request; and transmit the response to the data request.

16. The computer-program product of claim 15, wherein the one or more levels includes a sublevel, and wherein the depth level corresponds to the sublevel.

17. The computer-program product of claim 15, wherein the one or more additional commands are each separately issued to the RESTful API.

18. The computer-program product of claim 15, wherein the one or more additional responses are each separately received from the RESTful API.

19. The computer-program product of claim 15, wherein the data request includes filtering criteria, and wherein the filtering criteria includes a requirement for at least one of the subset of the data or an additional subset of the data of the one or more additional subsets of the data.

20. The computer-program product of claim 19, wherein the instructions further cause the one or more processors to:

before transmitting the response to the data request, filtering the at least one of the subset of the data or the additional subset of the data according to the requirement.

\* \* \* \* \*

UNITED STATES PATENT AND TRADEMARK OFFICE
CERTIFICATE OF CORRECTION

PATENT NO. : 9,996,301 B1  
APPLICATION NO. : 15/380184  
DATED : June 12, 2018  
INVENTOR(S) : Katarki et al.

Page 1 of 1

It is certified that error appears in the above-identified patent and that said Letters Patent is hereby corrected as shown below:

On the Title Page

Column 1, under Notice, Line 3, after "0 days." delete "days.".

In the Specification

In Column 1, Line 53, delete "nodes. the" and insert -- nodes. The --, therefor.

In Column 11, Line 29, before "a" delete "the".

Signed and Sealed this  
Twenty-ninth Day of January, 2019

Andrei Iancu  
*Director of the United States Patent and Trademark Office*